Nov. 6, 1951     C. L. JOHANNESSON     2,573,974
DEMOUNTABLE PIPE COUPLING
Filed Nov. 18, 1947
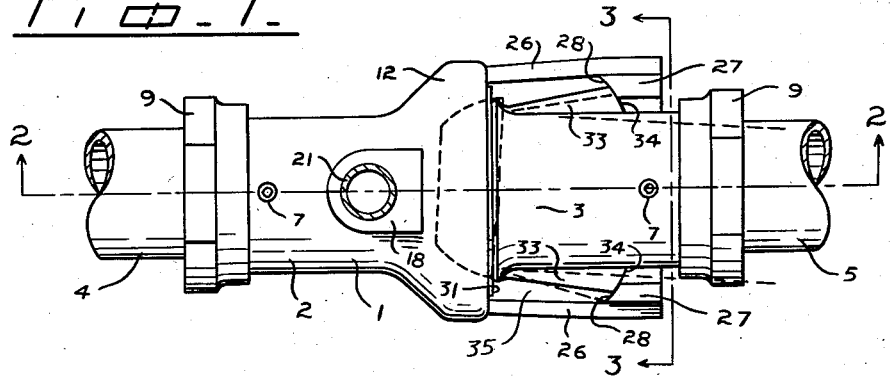
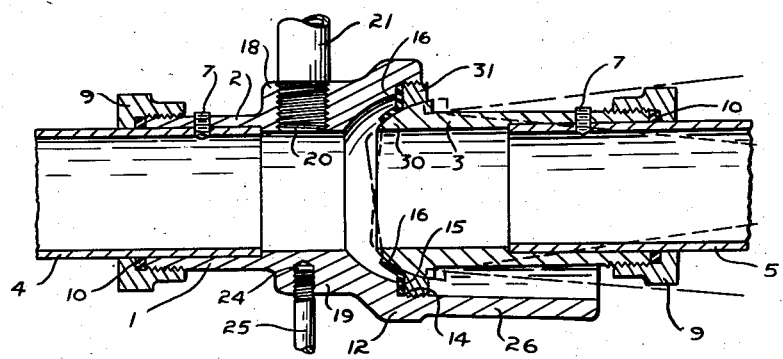
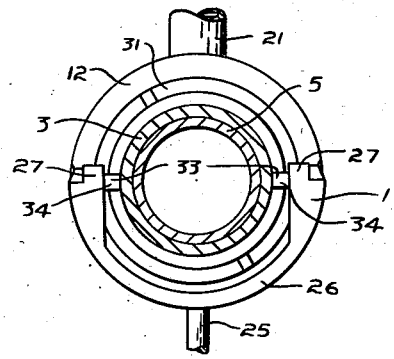
INVENTOR
CHARLES LOUIS JOHANNESSON
*Ernest E. Carver*
ATTORNEY Patented Nov. 6, 1951

2,573,974

UNITED STATES PATENT OFFICE 2,573,974

DEMOUNTABLE PIPE COUPLING

Charles Louis Johannesson, Osoyoos, British Columbia, Canada

Application November 18, 1947, Serial No. 786,649

3 Claims. (Cl. 285—143)

My invention relates to improvements in quickly demountable pipe couplings.

The object of the present invention is to provide a coupling which is particularly adapted for use in orchard and garden irrigation, where it is frequently necessary to change the disposition of the sprinkler system or change the run of pipe from one place to another. A further object is to provide a coupling which will permit pipes connected thereby to be either aligned with each other or to be connected at a substantial angle to each other and still provide a watertight joint between them. A further object is to provide a coupling which can be connected or disconnected by skilled or unskilled persons and without the use of tools of any kind.

Referring to the drawings:

Figure 1 is a plan view of the invention.

Figure 2 is a longitudinal sectional view taken on the line 2—2 of Figure 1.

Figure 3 is a transverse sectional view taken on the line 3—3 of Figure 1.

In the drawings like characters of reference indicate corresponding parts in each figure.

The numeral 1 indicates generally a coupling consisting of a socket member 2 and a spigot member 3, which are respectively fitted to pipes 4 and 5. Both members 2 and 3 are provided with set screws 7 which are adapted to be driven into the side wall of their respective pipes to hold said member thereon and both members are also provided at their outer ends with gland nuts and washers 9 and 10 to render the joint between each member and its pipe proof against leakage.

The socket member 2 is provided with a bell 12 at its inner end which is provided with a threaded recess 14 having a seat 15 for a cupped washer 16, which washer is of substantially flexible material, such as soft leather or rubber. Between the bell 12 and the outer end of the socket member 2 is an upper boss 18 and a lower boss 19. The upper boss is provided with a threaded port or opening 20 into which a stand pipe 21 is adapted to be screwed, this stand pipe is adapted to support at its upper end a sprinkler of any suitable type, not shown. The boss 19 is provided with a threaded opening 24 into which a ground spike 25 is screwed. The spike 25 is adapted to be driven into the ground to hold the pipe 4 against rotational movement about its longitudinal axis and to prevent the adjacent end of said pipe from moving laterally when the spigot member 3 of a pipe 5 is being jointed to its complementary socket member 2.

Extending from the bell 12 is a sheath 26 which is somewhat greater than 180 degrees in circumference and which is provided with a pair of diametrically opposed lugs 27 at its outer end. The inner ends of the lugs 27 are bevelled as at 28, the purpose of which will hereinafter appear.

The spigot member 3 is provided at its inner end with a ball part 30, which is adapted to seat with a cupped and threaded ring 31 inserted into the recess 14 of the bell 12. The cupped ring 31 serves to hold the washer 16 in place in the bell and while it is fitted to the ball part 30 with reasonable accuracy, it is not intended per se to render the coupling water tight.

A pair of diametrically disposed ribs 33 are formed longitudinally of the spigot member 3, which are provided with arcuately bevelled ends 34 for the purpose of engaging the similarly bevelled faces 28 of the lugs 27. The major transverse width of the ribs 33 is less than the annular space 35 defined between the sides of the spigot member 3 and the inner peripheral face of the sheath 26, so that the member can lie in said sheath in alignment with, or in substantial disalignment, with the socket member 2.

In assembling the coupling as for use in an orchard, the part 2 is laid down on the ground and the spike 25 is driven vertically downward into the soil, a pipe 5 fitted with a spigot member 3 is tilted in a substantially vertical plane and the ball 30 of said spigot member thrust into the retainer ring 31 and into firm contact with the washer 16. The pipe is then lowered to enable the bevelled ends of the ribs 33 to engage bevelled faces 28 of the lugs 27 of the sheath 26 and to exert such thrust onto the washer as to ensure a water tight joint between said washer and the ball 30.

An alternate method of connection would be to enter the spigot member 3, with its ribs 33 lying in a substantially vertical plane, into the sheath 26 with both pipes approximately aligned and to give the spigot member and pipe 5 a quarter turn while exerting an endwise pressure on the pipe to facilitate engagement between the ribs 33 and the lugs 27.

If the pipe 5 is brought to rest in a position above the longitudinal axis of the pipe 4, as shown in chain dotted line in Figure 2, the ball portion at the upper side of the figure will cup the washer 16 to a greater extent than the ball portion on the lower side of the figure will cup the corresponding portion of the said washer. The sealing contact between the ball and the washer is sufficient per se to make a substantially water tight joint, but obviously when water is flowing through the coupling the interior pressure upon the washer against the ball will increase and ensure against any leakage therebetween.

What I claim as my invention is:

1. A quick demountable pipe comprising a socket member and a spigot member each adapted for connection to a pipe, said spigot member having a cylindrical stem terminating in a ball part and said socket member having a resilient washer adapted to form a seat for the ball part, said socket member having a pair of lugs spaced substantially 180 degrees apart and having engaging arcuately bevelled end surfaces, said spigot member having a pair of ribs provided with complementary engaging arcuately bevelled end surfaces, said lugs and ribs serving to retain the ball part in watertight relation with the washer and to permit the spigot and socket members to be at varying degrees of disalignment.

2. A quick demountable pipe comprising a socket member and a spigot member each adapted for connection to a pipe, said spigot member having a cylindrical stem terminating in a ball part and said socket member having a resilient washer adapted to form a seat for the ball part, said socket member having a pair of lugs spaced substantially 180 degrees apart and having engaging arcuately bevelled end surfaces, said spigot member having a pair of ribs provided with complementary engaging arcuately bevelled end surfaces, said lugs and ribs serving to retain the ball part in watertight relation with the washer, said lugs being spaced diametrically of the socket member to provide a substantial clearance between said lugs and the stem of the spigot member wherein to permit the spigot member to be misaligned with respect to the socket member.

3. A quick demountable pipe comprising a socket member and a spigot member each adapted for connection to a pipe, said spigot member having a cylindrical stem terminating in a ball part and said socket member having a resilient washer adapted to form a seat for the ball part, said socket member having a pair of lugs spaced substantially 180 degrees apart and having engaging arcuately bevelled end surfaces, said spigot member having a pair of ribs provided with complementary engaging arcuately bevelled end surfaces, said lugs and ribs serving to retain the ball part in watertight relation with the washer, said lugs being spaced diametrically of the socket member to provide a substantial clearance between said lugs and the stem of the spigot member wherein to permit the spigot member to be misaligned with respect to the socket member in any direction about the longitudinal axis of said socket member.

CHARLES LOUIS JOHANNESSON.

REFERENCES CITED

The following references are of record in the file of this patent:

UNITED STATES PATENTS

| Number | Name | Date |
|---|---|---|
| 448,966 | Lawless | Mar. 24, 1891 |
| 642,853 | Simmons | Feb. 6, 1900 |
| 787,391 | Niederlander | Apr. 18, 1905 |
| 1,994,007 | Tallant | Mar. 12, 1935 |
| 2,043,562 | Tailleferre | June 9, 1936 |